United States Patent [19]

Takiguchi et al.

[11] Patent Number: 5,788,532
[45] Date of Patent: Aug. 4, 1998

[54] MOUNTING STRUCTURE FOR AN ELECTRICAL MODULE

[75] Inventors: Shuji Takiguchi; Atsuyoshi Yamaguchi, both of Shizuoka, Japan

[73] Assignee: Yazaki Corporation, Tokyo, Japan

[21] Appl. No.: 803,188

[22] Filed: Feb. 19, 1997

[30] Foreign Application Priority Data

Feb. 20, 1996 [JP] Japan .................................. 8-032428

[51] Int. Cl.[6] .................................................. H01R 33/00
[52] U.S. Cl. ........................... 439/374; 361/740; 361/741; 439/297; 439/347; 439/289; 439/298
[58] Field of Search ........................... 439/34, 374, 375, 439/376, 377, 382, 383; 361/725, 726, 727, 732, 740, 741

[56] References Cited

U.S. PATENT DOCUMENTS 5,441,421  8/1995  Ponticelli et al. ....................... 439/284
5,510,957  4/1996  Takagi ..................................... 361/814

FOREIGN PATENT DOCUMENTS 7-96774   4/1995  Japan .

Primary Examiner—Khiem Nguyen
Assistant Examiner—Eugene G. Byrd
Attorney, Agent, or Firm—Armstrong, Westerman, Hattori, McLeland & Naughton

[57] ABSTRACT

A plurality of surface terminals are disposed on the peripheral surface of the base casing of an electrical module, and a plurality of connection terminals which are joined to the surface terminals are disposed on the peripheral wall of the module accommodating portion of an instrument panel. Guide grooves are provided in the peripheral wall of a front casing, and anchoring pins which are anchored to the guide grooves are provided in the peripheral wall of the module accommodating portion so that the pins can freely be protruded into or retracted from the module accommodating portion. By fitting the electrical module into the module accommodating portion, the electrical module is fixed to the instrument panel and also the surface terminals are joined to the connection terminals.

11 Claims, 10 Drawing Sheets

MOUNTING STRUCTURE FOR AN ELECTRICAL MODULE

FIELD OF THE INVENTION

The present invention relates to a mounting structure that is used to fit to the instrument panel portion of an automobile an electrical module incorporated integrally with switches, measuring instruments, and control circuits for the switches and measuring instruments which are fitted on the instrument panel portion.

The electrical module used herein means an electrical product formed by integrally uniting switches, measuring instruments, electronic functional parts for controlling the switches and measuring instruments, and a flexible printed-wiring plate.

DESCRIPTION OF THE PRIOR ART

The electric circuitry in the instrument panel of an automobile has hitherto been formed by manually disposing a wire harness formed based on requisite electric circuitry on the body of the automobile and the dashboard of the instrument panel portion and connecting the connector of the wire harness to the connector of switches and measuring instruments.

On the other hand, with high advancement in the electronic circuitry and electric control in automobiles, an increase in the number of switches and measuring instruments and a complexity in the electric circuitry are becoming conspicuous in the instrument panel portion provided in front of a driver. The wire harness that is used to form the circuitry has become further increased in size and weight. As a consequence, it becomes difficult to accommodate switches and measuring instruments into a limited space and also the mounting operation tends to become extremely complicated and inefficient.

Figure 13:
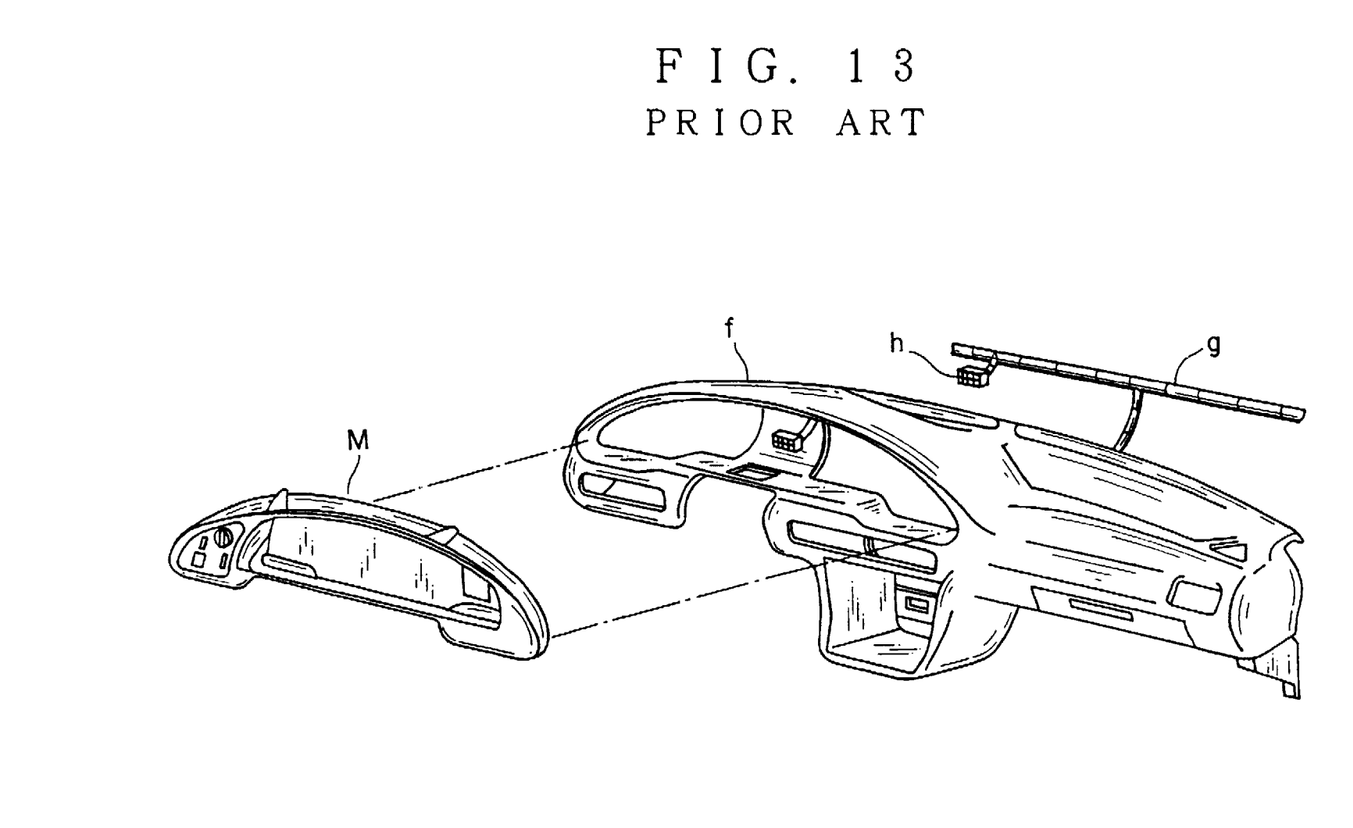
FIG. 13 is an exploded perspective view showing a conventional meter module.

Hence, in Japanese Patent Application Laid-Open No. HEI 7-96774 there has been proposed a meter module M such as that shown in FIG. 13, in order to simplify the electric circuitry of the instrument panel portion.

The meter module M is constituted by a cluster module (d) and a finish panel (e) which is attached to the front of the cluster module (d). The cluster module (d) is formed by integrally uniting (1) an instrument board (a) in which meters, display lamps, and drive circuits for these were mounted, (2) an electric connection box (b) into which electric power to vehicle-mounted electrical parts, including the aforementioned meters and display lamps, and functional circuitry for performing distribution and control of input and output signals were incorporated, and (3) a switch unit (c) into which the switches of the vehicle-mounted electric parts were incorporated.

Figure 14:
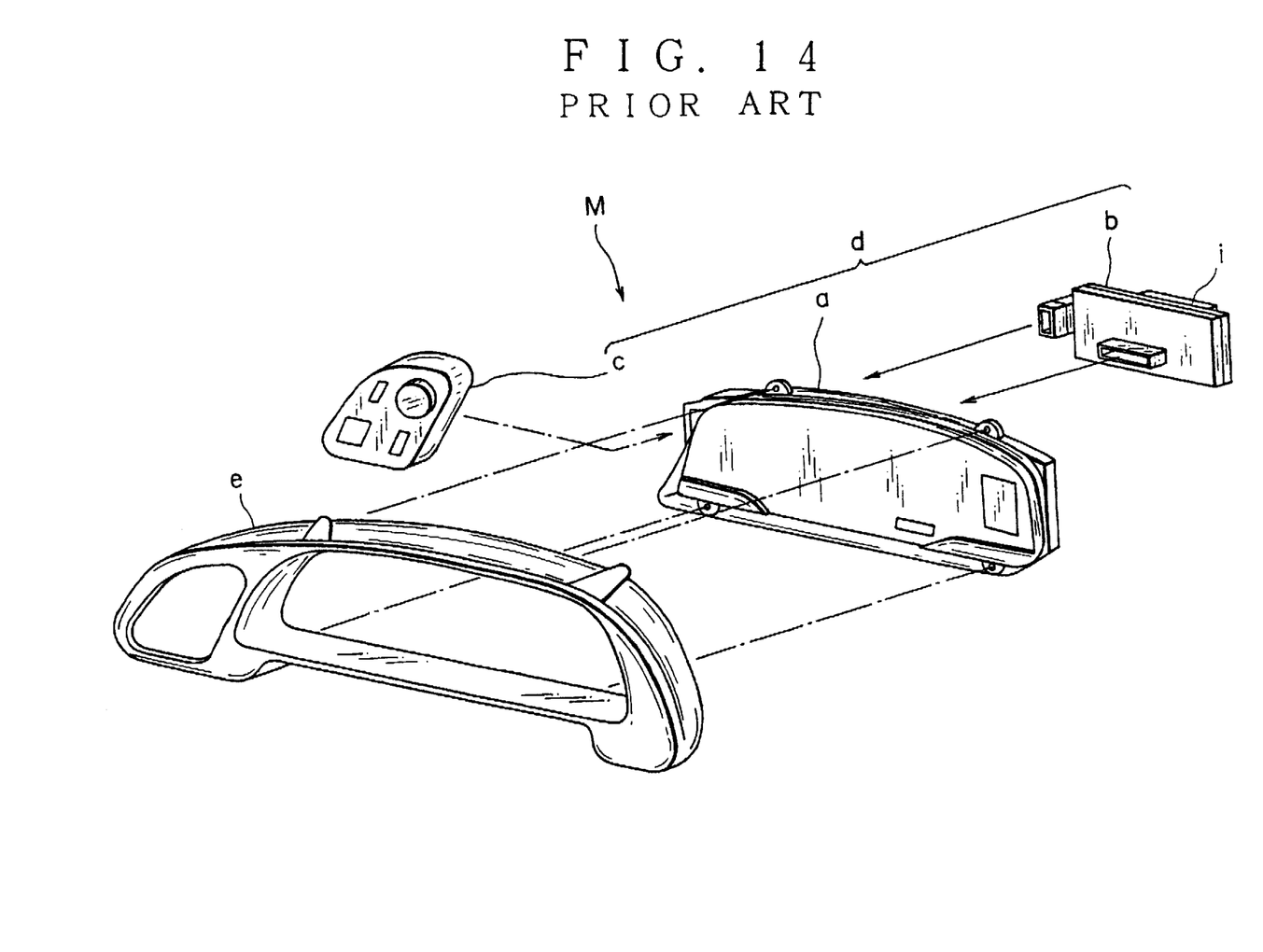
FIG. 14 is an exploded perspective view showing how the meter module of FIG. 13 is mounted to an instrument panel.

The meter module M, as shown in FIGS. 13 and 14, is mounted to a predetermined portion of an instrument panel (f) and is connected electrically to a wire harness (g) within a motor vehicle by coupling together a connector (h) connected to the wire harness and a connector (i) connected to the module M.

However, for the aforementioned meter module M, in the case where the distance between the connector (h) of the wire harness (g) and the connector (i) on the side of the meter module M is long, the mutual positional offset between both connectors (h) and (i) is enlarged according to the distance, so there is the need to use an expensive movable connector which could be connected even if positional offset were present. However, even if an expensive movable connector were adopted in the connector (h) of the wire harness, there would be many cases where an operation of absorbing positional offset and coupling both connectors (h) and (i) together becomes a blind operation, so there is the problem that the operability is considerably reduced.

In addition, it is difficult to correspond wires to a flat harness disposed in the form of a flat plate, or the attaching and detaching of a module will become impossible if a lock mechanism like a common connector is adopted in a connection structure. For these reasons, there is the problem that a module must be fixed by means of screws and that the misunderstanding of operators will easily come to occur and connection failure will frequently occur.

SUMMARY OF THE INVENTION

It is therefore an objective of the present invention to provide an electrical module mounting structure where the coupling of the connector of a wire harness on the side of a vehicular body and the connector of an electrical module is performed reliably and smoothly and where the operability in a mounting process is considerably enhanced, in mounting an electrical module, such as a meter module, to an instrument panel.

The foregoing objective is accomplished by providing an electrical module mounting structure for mounting an electrical module, incorporating switches, measuring instruments, and electric circuitry for performing control of the switches and the measuring instruments, to a module accommodating portion provided in an instrument panel. The electrical module mounting structure comprises surface terminals disposed on a peripheral wall of a casing of the electrical module, connection terminals disposed on a peripheral wall of the module accommodating portion of the instrument panel which are to be connected with the surface terminals, and a guide groove provided in a peripheral wall of either one of the casing or the module accommodating portion. The guide groove has an anchoring hole at one end thereof and an introduction portion expanded at the other end in a fitting direction. The electrical module mounting structure further comprises an anchoring-body accommodating chamber provided in a peripheral wall of the other of the casing or the module accommodating portion. An anchoring pin is accommodated in the anchoring-body accommodating chamber so that it can freely be protruded and retracted. By fitting the electrical module into the module accommodating portion to fit the anchoring pin into the anchoring hole, the electrical module is fixed to the instrument panel, and the surface terminals and the connection terminals are joined to perform an electrical connection.

In a preferred form of the present invention, the electrical module comprises a rear casing accommodating electric circuitry and a front casing provided with switches, and surface terminals are provided on a peripheral wall of the rear casing.

In another preferred form of the present invention, a press body equipped with an anchoring pin is accommodated in the anchoring-body accommodating chamber and is always urged toward the projection side of the anchoring pin through an elastic body so that the anchoring pin can freely be protruded into or retracted from the module accommodating portion.

In still preferred form of the present invention, an anchor releasing opening is provided near the anchoringbody accommodating chamber so that it can communicate with the anchoring-body accommodating portion.

In a further preferred form of the present invention, the guide groove is provided at its bottom portion with a taper portion inclined in a direction where the depth of the guide groove is increased toward to an open end of the groove.

BRIEF DESCRIPTION OF THE DRAWINGS

The present invention will be described in further detail with reference to the accompanying drawings, in which.

DETAILED DESCRIPTION OF THE PREFERRED EMBODIMENTS

Figure 1:
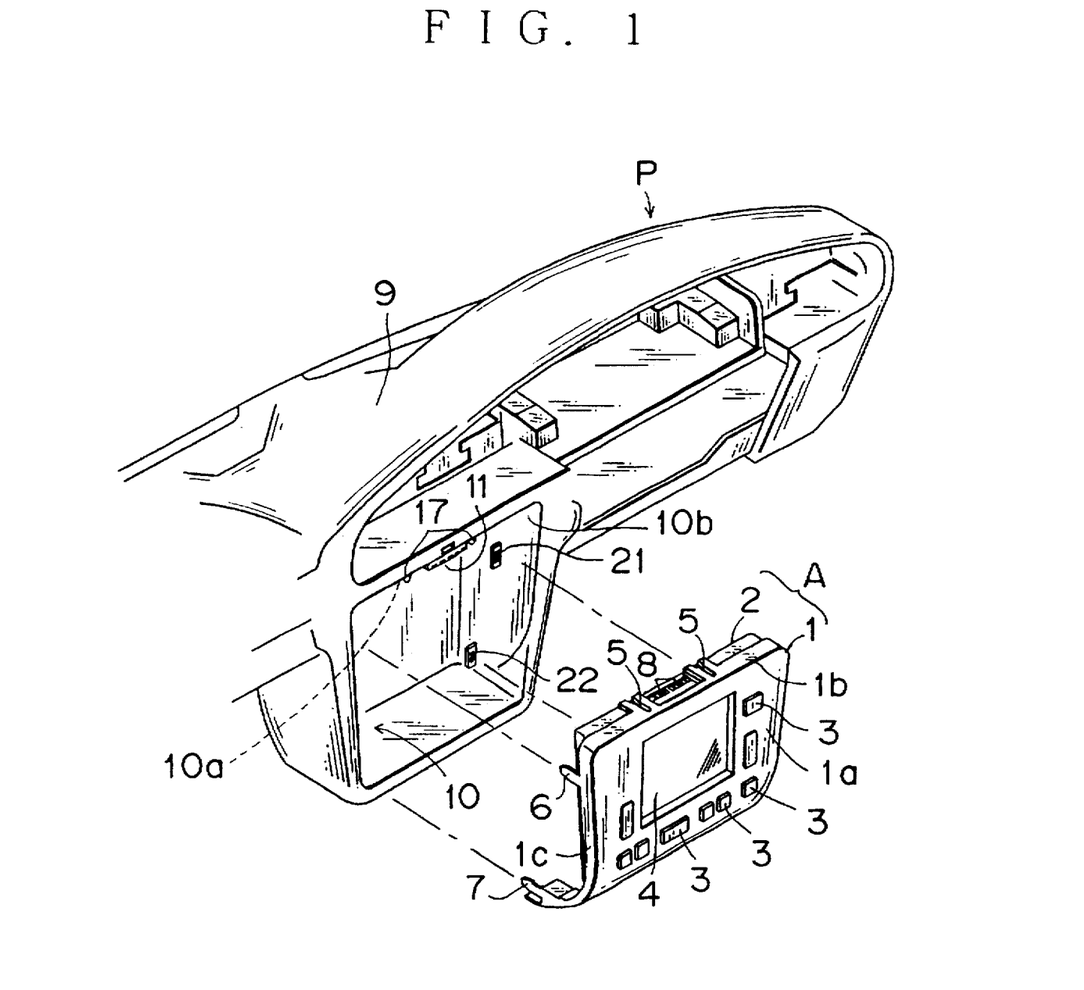
FIG. 1 is a perspective view showing an electrical module and an instrument panel according to an embodiment of the present invention, the electrical module being detached from the instrument panel.

Referring to FIG. 1, there is shown an electrical module A constructed in accordance with an embodiment of the present invention. The electrical module A is formed as a center cluster module which is mounted in the near center portion of instrument panel P, and consists of front casing 1 called a facing panel and rear casing 2 accommodating various control circuits therein.

The front casing 1 is formed into a cover shape which covers the rear casing 2, and is provided at its front portion 1a with a plurality of switches 3 and a display portion 4 for displaying the operating states of instruments and various information. The switch 3 and the display portion 4 are connected to the circuitry provided in the rear casing 2. The top peripheral wall 1b of the front casing 1 is formed with two guide grooves 5 provided in parallel, as shown in FIGS. 2 and 3, and the side peripheral walls 1c are provided with pairs of upper and lower support tongues 6 and 7, respectively (only one pair shown).

Figure 2:
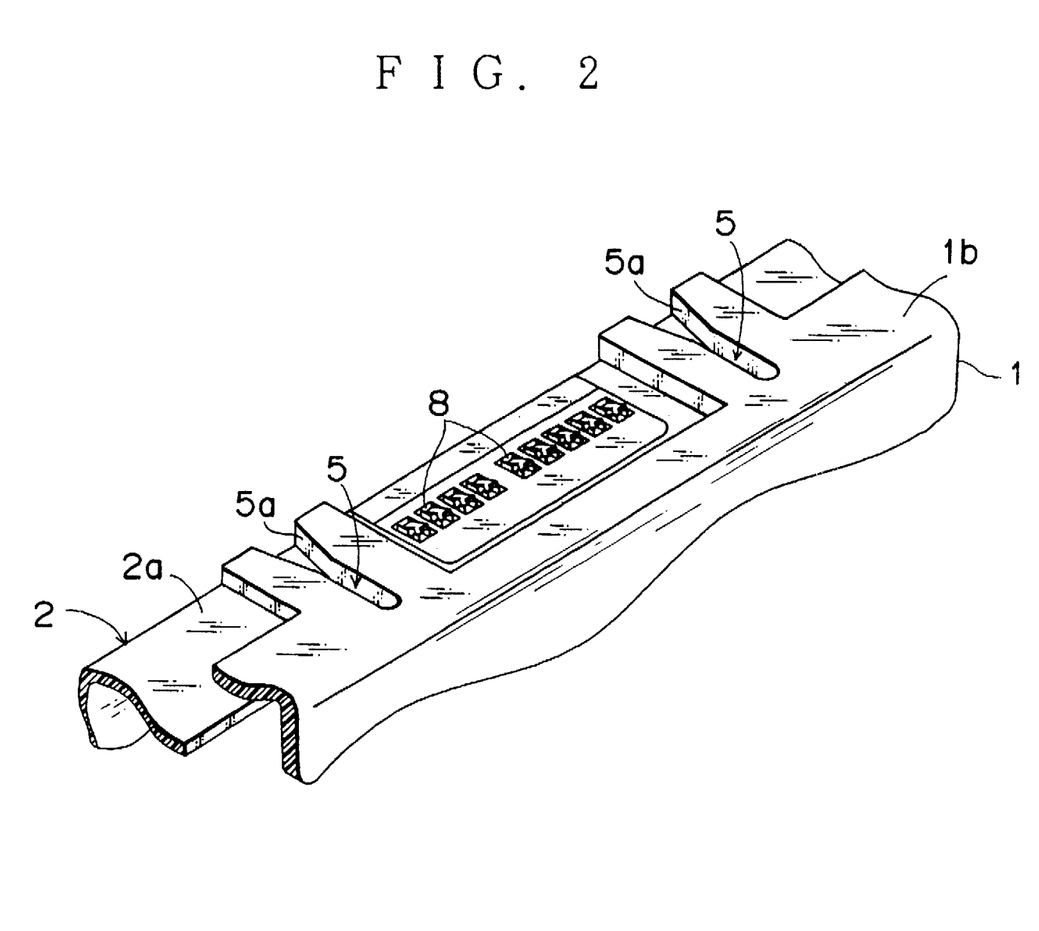
FIG. 2 is a perspective view showing the essential part of the electrical module of FIG. 1.
Figure 3:
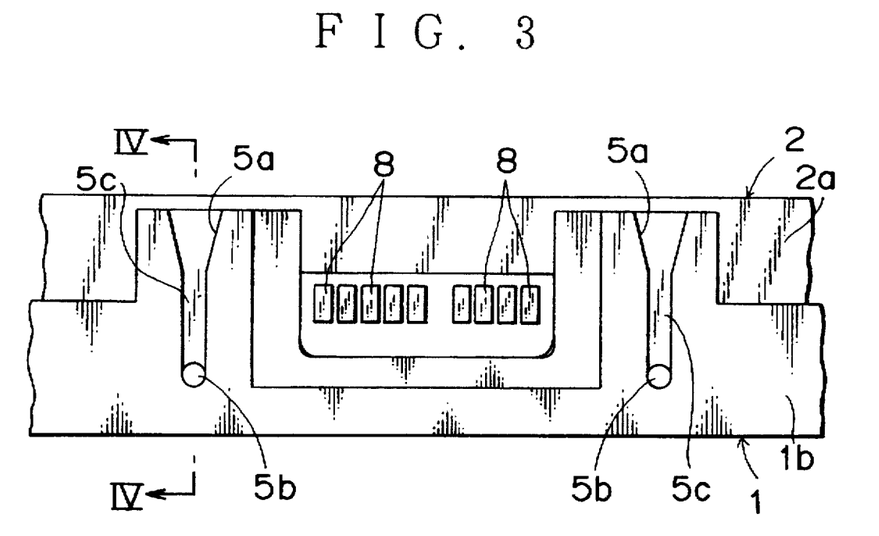
FIG. 3 is a plan view of the electrical module of FIG. 2.

Each of the guide grooves 5, as clearly shown in FIGS. 2 and 3, has at one end thereof an introduction portion 5a expanded in the direction which the electrical module A is fitted into the instrument panel P, and the other end is recessed to form an anchoring hole 5b. The bottom wall 5c of the guide groove 5, as shown in FIG. 4, has a flat portion 5c1 on the side of the anchoring hole 5b, and on the side of the introduction portion 5a, a downwardly inclined taper portion 5c2 is formed so that the depth of the guide groove 5 is increased toward the open end thereof.

The rear casing 2 is formed into a box shape, and on the top peripheral wall 2a thereof, a plurality surface terminals 8 connected to various control circuits accommodated in the rear casing 2 are interposed between the spaced guide grooves 5 of the front casing 1.

Figure 4:
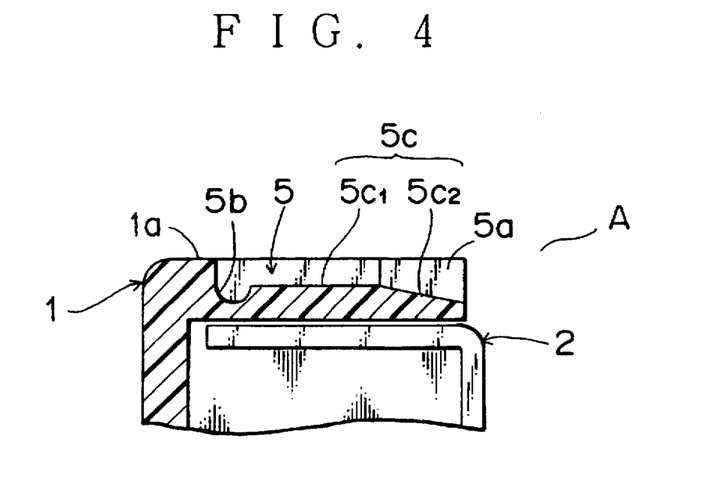
FIG. 4 is a sectional view of the electrical module substantially taken along IV—IV of FIG. 3.

As shown in FIG. 4, the electrical module A is assembled by fitting the front casing 1 onto the rear casing 2.

The instrument panel P comprises a molded body 9 formed from a synthetic resin material by molding, and at the near center portion thereof, a box-shaped module accommodating portion 10 is formed for accommodating the electrical module A.

Figure 5:
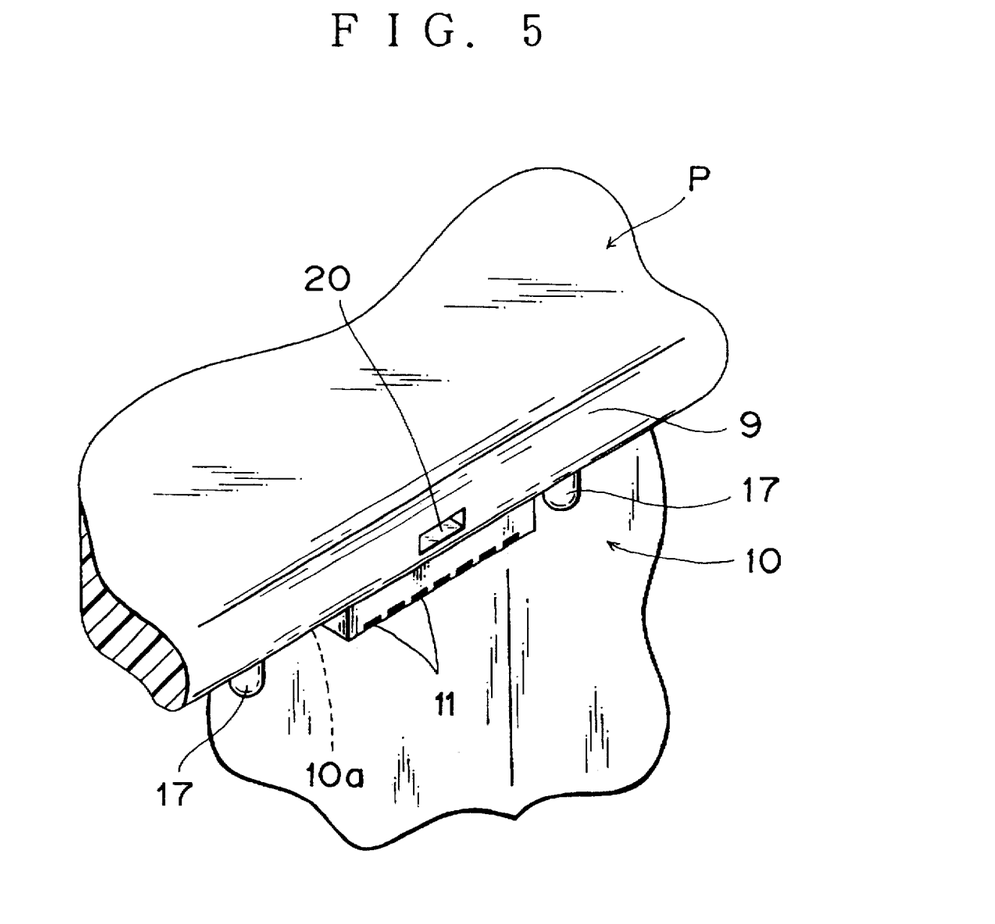
FIG. 5 is a perspective view showing the essential part of the module accommodating portion shown in FIG. 1.

The upper peripheral wall 10a of the module accommodating portion 10, as shown in FIG. 5, is provided with a plurality of connection terminals 11 arranged in a row, and the terminals 11 are connected to a wire harness disposed in the instrument panel P.

Figure 6:
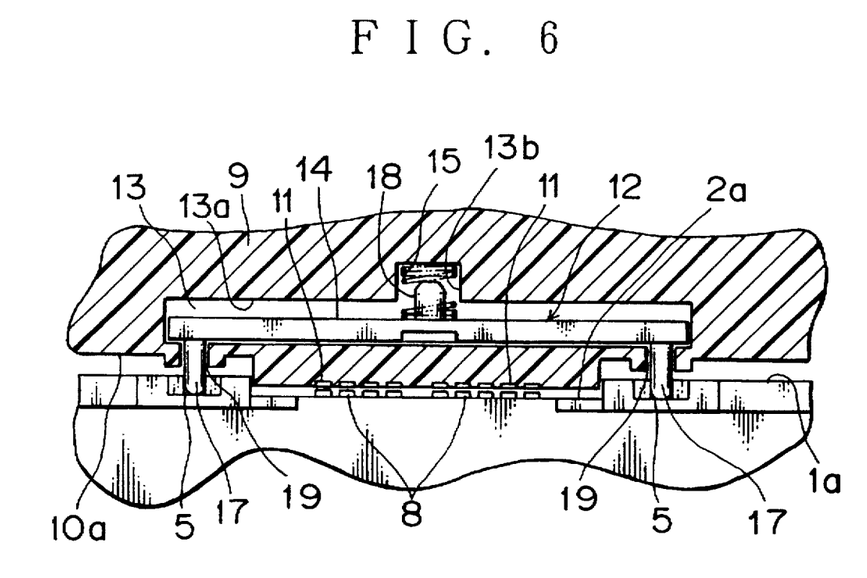
FIG. 6 is a sectional view showing an anchoring-body accommodating chamber provided in the upper wall of the module accommodating portion shown in FIG. 5.
Figure 7:
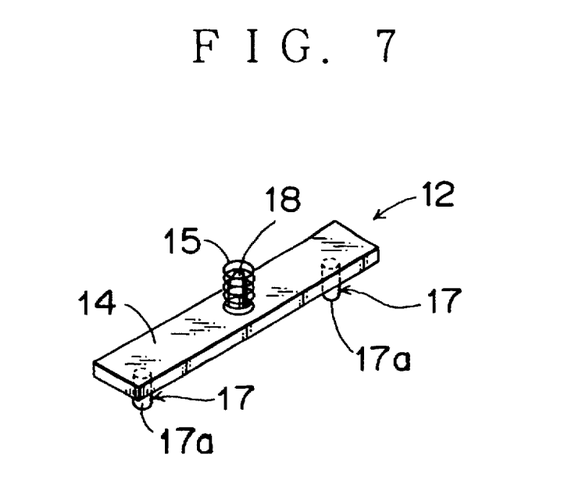
FIG. 7 is a perspective view showing a press body which is accommodated into the anchoring-body accommodating chamber of FIG. 6.

A molded body 9 above the position at which the connection terminals 11 are arranged in a row is provided with a rectangular anchoring-body accommodating chamber 13 for accommodating a press body 12, as shown in FIG. 6. The press body 12, as shown in FIG. 7, consists of a base plate 14 and a spring 15 as an elastic body for pressing the base plate 14. In FIG. 6 there is shown the press body 12 accommodated within the anchoring-body accommodating chamber 13. The base plate 14 of the press body 12 has cylindrical, spaced anchoring pins 17 protruding downward from the opposite end portions of the plate 14 and a support projection 18 stood up in the longitudinal center portion of the plate 14 in the direction opposite to the anchoring pins 17. The point portion 17a of the anchoring pin 17 is formed into a hemispherical shape, and a spring 15 is fitted onto the support projection 18.

The anchoring-body accommodating chamber 13 is provided at its ceiling wall 13a with a recess portion 13b into which the spring 15 of the press body 12 is inserted. The opposite end portions of the anchoring-body accommodating chamber 13 are provided with through-holes 19, and the anchoring pins 17 of the press body 12 are inserted into the through-holes 19 and protrude from the upper peripheral wall 10a of the module accommodating portion 10. In the upper peripheral wall 10a of the module accommodating portion 10 positioned at the front of the anchoring-body accommodating chamber 13, as shown in FIG. 8, an anchor releasing opening 20 communicating with the anchoring-body accommodating chamber 13 is formed so that it is opened forward.

Now, a description will be made of the process of fitting the electrical module A into the module accommodating portion 10 of the instrument panel P.

Figure 8:
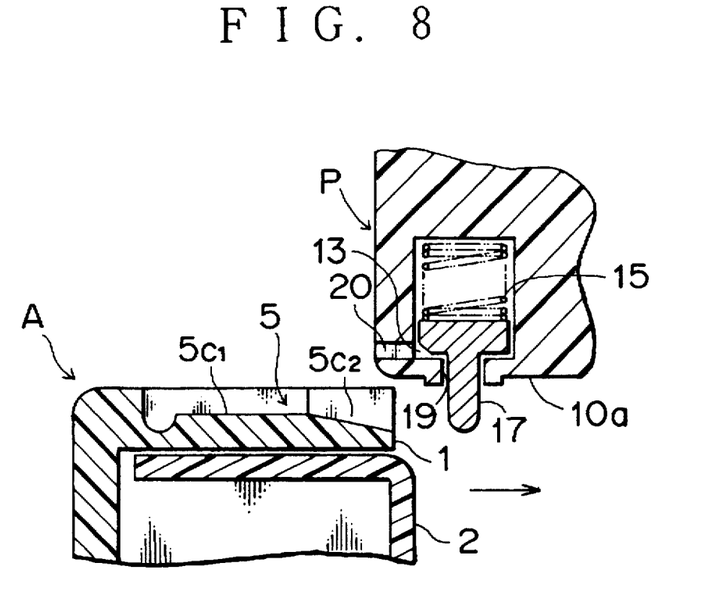
FIGS. 8 and 9 are sectional views used to explain how the electrical module of FIG. 1 is attached to the instrument panel.
Figure 9:
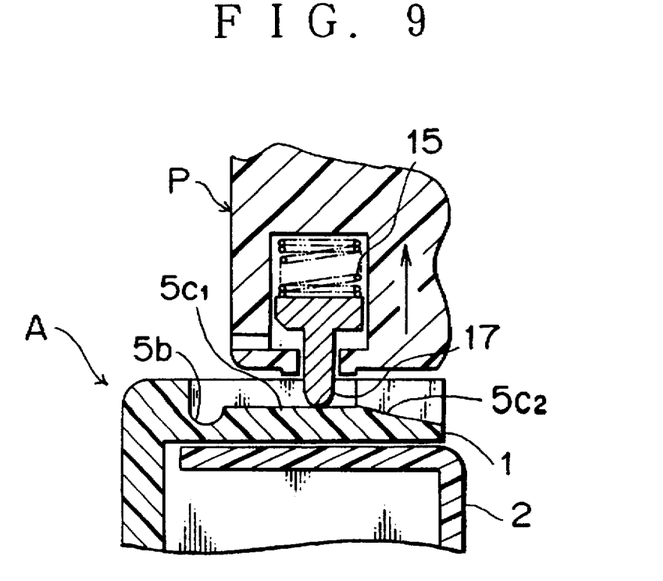

First, both guide grooves 5 of the electrical module A are aligned with the anchoring pins 17 protruded from the upper peripheral wall 10a of the module accommodating portion 10, and the electrical module A is forced into the module accommodating portion 10 in the direction indicated by an arrow in FIG. 8. Each of the anchoring pins 17, as shown in FIG. 9, is raised in an arrow-indicating direction along the taper portion 5c2 and flat portion 5c1 of the guide groove 5 and compresses the spring 15.

Figure 10:
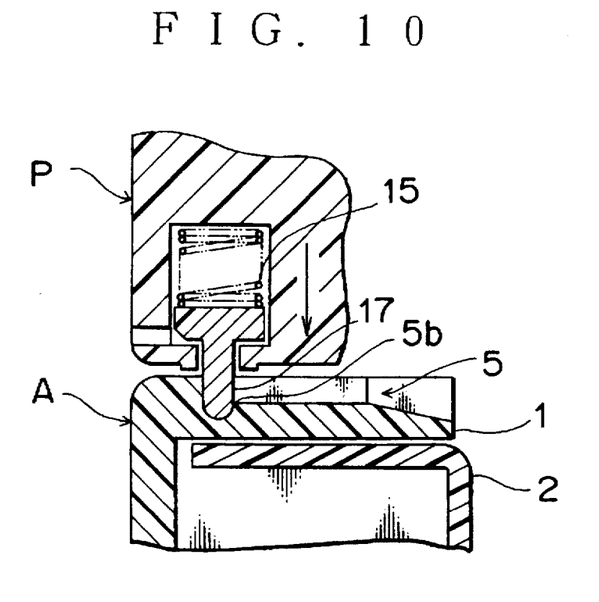
FIG. 10 is a sectional view showing the electrical module anchored to the instrument panel.

If the electrical module A is further forced into the module accommodating portion 10, the anchoring pin 17 will be pushed by the elastic force of the spring 15 and get into the anchoring hole 5 of the guide groove 5 to anchor the electrical module A, as shown in FIG. 10. At this time, as shown in FIG. 1, the upper and lower support tongues 6 and 7 of the front casing 1 of the electrical module A are fitted into upper and lower lock holes 21 and 22 (only one pair shown) provided on both side peripheral walls of the module accommodating portion 10, and the fitting of the electrical module A into the module accommodating portion 10 of the instrument panel P is locked.

Figure 11:
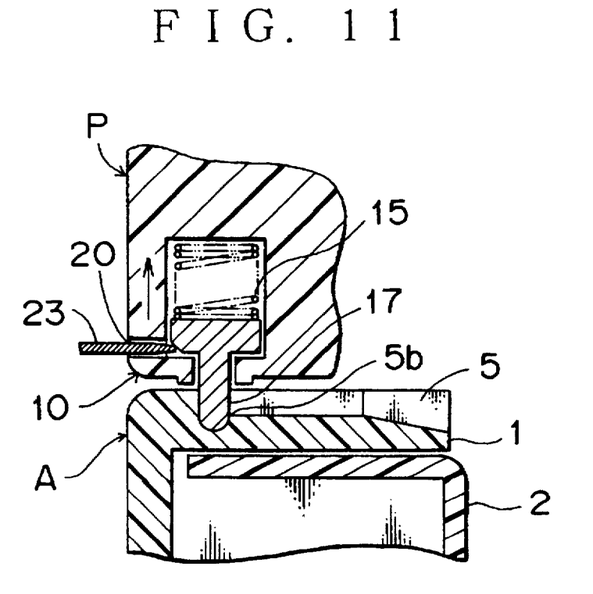
FIG. 11 is a sectional view used to explain how the electrical module is detached from the instrument panel.

When the electrical module A is detached from the module accommodating portion 10 of the instrument panel P, a rod lever 23 is inserted into the anchor releasing opening 20, as shown in FIG. 11. Then, the base plate 14 of the press body 12 is pushed upward (in an arrow-indicating direction) by the rod lever 23. As a consequence, the anchoring pins 17 are detached from the anchoring holes 5b of the guide grooves 5 and the electrical module A can be pulled out of the module accommodating portion 10 of the instrument panel P.

Figure 12:
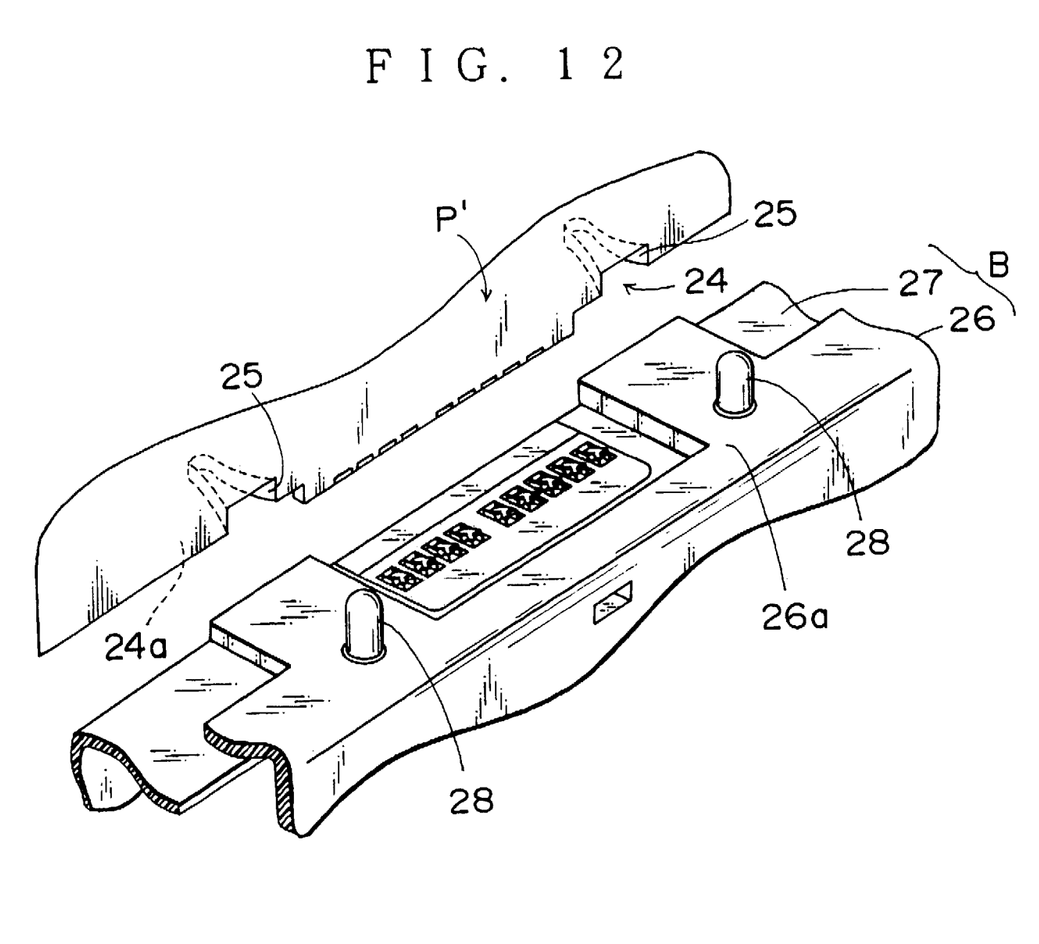
FIG. 12 is a perspective view showing an electrical module and the module accommodating portion of an instrument panel according to another embodiment of the present invention.

Referring to FIG. 12, there is shown an electrical module mounting structure constructed in accordance with another embodiment of the present invention. In this embodiment an electrical module B is mounted on a module accommodating portion 24 provided in an instrument panel P'.

The mounting structure shown in FIG. 12 is an example of the reversed structure of the mounting structure for the electrical module A of the aforementioned embodiment. Guide grooves 25 are provided in the upper peripheral wall 24a of the module accommodating portion 24 of the instrument panel P'. The electrical module B consists of a front casing 26 and a rear casing 27, and anchoring pins 28 are provided in the top peripheral wall 26a of the front casing 26 so that they can freely be protruded from or retracted into the top peripheral wall 26a of the front casing 26.

The guide groove 25 has a similar structure as the guide groove 5 of the electrical module A of the aforementioned embodiment and the structure of the anchoring pin 28 provided in the electrical module B is also similar to that of the anchoring pin 17 of the press body 12 of the aforementioned embodiment, so a description is omitted for avoiding redundancy. The attaching and detaching of the electrical module B with respect to the instrument panel P' can also be performed in the same way as the case of the aforementioned electrical module A.

While the aforementioned electrical modules A and B are both called a center cluster module, the present invention is not limited to the center cluster module but it is also applicable to other modules which are mounted on other places of the instrument panel, such as meter modules and cluster modules.

According to the present invention, guide grooves expanded in a fitting direction are provided in a peripheral wall of either one of the casing or the module accommodating portion, and anchoring pins are provided in the other peripheral wall so that they can freely be protruded and retracted. Accordingly, the positioning of the casing and the module accommodating portion can be performed accurately and easily. Since the anchoring pins are fitted into the anchoring holes and anchored, a feeling of connection completion occurs, so a blind operation becomes possible. Because surface terminals are adopted, the attaching and detaching of the connection portions of electric circuits can be executed at the same time as the attaching and detaching of the casing of the electric module, so the operability in the mounting process is considerably enhanced.

In addition, since a structurally complicated connection part such as a movable connector is not employed, a connection to a flat wire harness becomes possible and an applicable range is expanded.

While the invention has been described with reference to preferred embodiments thereof, the invention is not to be limited to the details given herein, but may be modified within the scope of the appended claims.

What is claimed is:

1. An electrical module mounting structure for mounting an electrical module incorporated with switches, measuring instruments, and electric circuitry for performing control of the switches and the measuring instruments, to a module accommodating portion provided in an instrument panel, the electrical module mounting structure comprising:

surface terminals disposed on a peripheral wall of a casing of said electrical module;

connection terminals disposed on a peripheral wall of the module accommodating portion of said instrument panel which are joined to said surface terminals;

at least one guide groove provided in a peripheral wall of either one of said casing or said module accommodating portion, said guide groove having an anchoring hole at one end thereof and an introduction portion at the other end, the introduction portion being expanded toward a fitting direction where said electrical module is fitted into said module accommodating portion; and an anchoring-body accommodating chamber provided in a peripheral wall of the other of said casing or said module accommodating portion, an anchoring pin being accommodated in the anchoring-body accommodating chamber so that it can freely be protruded and retracted, wherein, by fitting said electrical module into said module accommodating portion to fit said anchoring pin into said anchoring hole, said electrical module is fixed to said instrument panel, and said surface terminals and said connection terminals are joined to perform an electrical connection.

2. The electrical module mounting structure as set forth in claim 1, wherein said electrical module comprises a rear casing accommodating electric circuitry and a front casing provided with switches, whereby surface terminals are provided on a peripheral wall of the rear casing.

3. The electrical module mounting structure as set forth in claim 1 or 2, wherein a press body equipped with at least one anchoring pin is accommodated in said anchoring-body accommodating chamber and is always urged toward the projection side of the anchoring pin through an elastic body so that said anchoring pin can freely be protruded into or retracted from said module accommodating portion.

4. The electrical module mounting structure as set forth in claim 1 or 2, wherein an anchor releasing opening is provided near said anchoring-body accommodating chamber so that it can communicate with said anchoring-body accommodating portion.

5. The electrical module mounting structure as set forth in claim 3, wherein an anchor releasing opening is provided near said anchoring-body accommodating chamber so that it can communicate with said anchoring-body accommodating portion.

6. The electrical module mounting structure as set forth in claim 1 or 2, wherein said guide groove is provided at its bottom portion with a taper portion inclined in a direction where the depth of the guide groove is increased toward to an open end of the groove.

7. The electrical module mounting structure as set forth in claim 3, wherein said guide groove is provided at its bottom portion with a taper portion inclined in a direction where the depth of the guide groove is increased toward to an open end of the groove.

8. The electrical module mounting structure as set forth in claim 4, wherein said guide groove is provided at its bottom portion with a taper portion inclined in a direction where the depth of the guide groove is increased toward to an open end of the groove.

9. The electrical module mounting structure as set forth in claim 5, wherein said guide groove is provided at its bottom portion with a taper portion inclined in a direction where the depth of the guide groove is increased toward an open end of the groove.

10. The electrical module mounting structure as set forth in claim 1 or 2, further comprises support tongues at side walls of the front casing of said electrical module and holes, to receive said support tongues, at side peripheral walls of said module accommodating portion of said instrument panel.

11. The electrical module mounting structure as set forth in claim 3, further comprises support tongues at side walls of the front casing of said electrical module and holes, to receive said support tongues, at side peripheral walls of said module accommodating portion of said instrument panel.

* * * * *